United States Patent

[11] 3,572,786

[72] Inventor John T. Dunton
 134 School Street, Bradford, Pa. 16701
[21] Appl. No. 853,592
[22] Filed Aug. 18, 1969
[45] Patented Mar. 30, 1971
 Continuation of application Ser. No. 678,136, Sept. 20, 1967, now abandoned, which is a division of application Ser. No. 421,580, Jan. 18, 1965, now abandoned.

[54] FIRE HYDRANT
 5 Claims, 12 Drawing Figs.
[52] U.S. Cl. .................................................. 287/108, 285/2
[51] Int. Cl. .................................................. F16d 9/00
[50] Field of Search ......................................... 287/108, 117; 285/2, 3, 4, ; 64/28; 137/797, 798, 68

[56] References Cited
UNITED STATES PATENTS
| | | | |
|---|---|---|---|
| 1,944,777 | 1/1934 | Banks | 287/108 |
| 2,340,965 | 2/1944 | Kiesel | 287/108 |
| 2,773,369 | 12/1956 | Klemm | 64/28 |

Primary Examiner—Thomas F. Callaghan
Assistant Examiner—Andrew V. Kundrat
Attorney—Daniel Rubin ABSTRACT: A fire hydrant having a frangible stem operative to open and close the hydrant. The stem is comprised of tandem, axially aligned, noncircular shafts secured together by an interlocking sleeve. The sleeve provides a zone of increased fracture susceptibility located overlying one or the other shafts.

INVENTOR.
JOHN T. DUNTON

ATTORNEY.

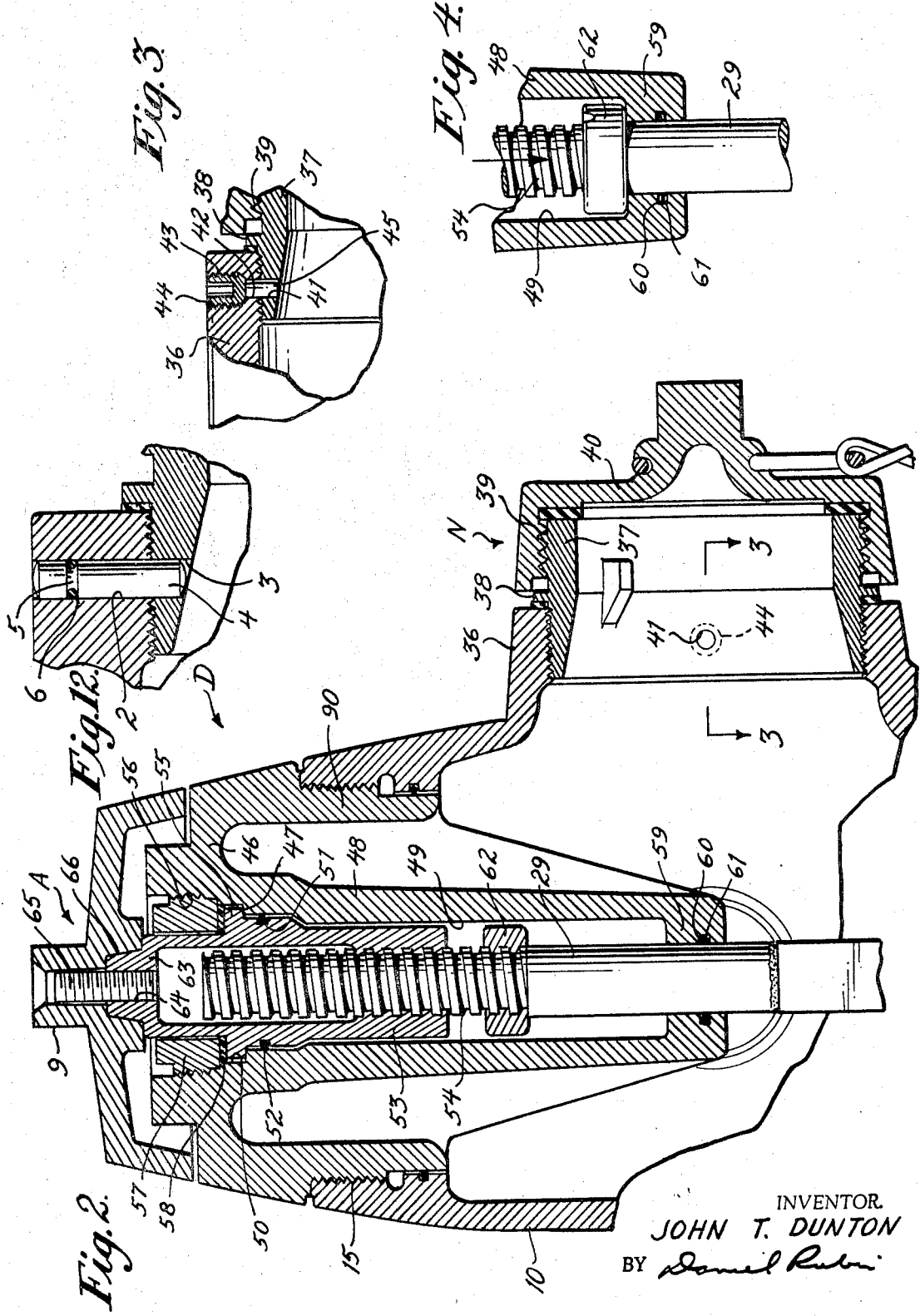

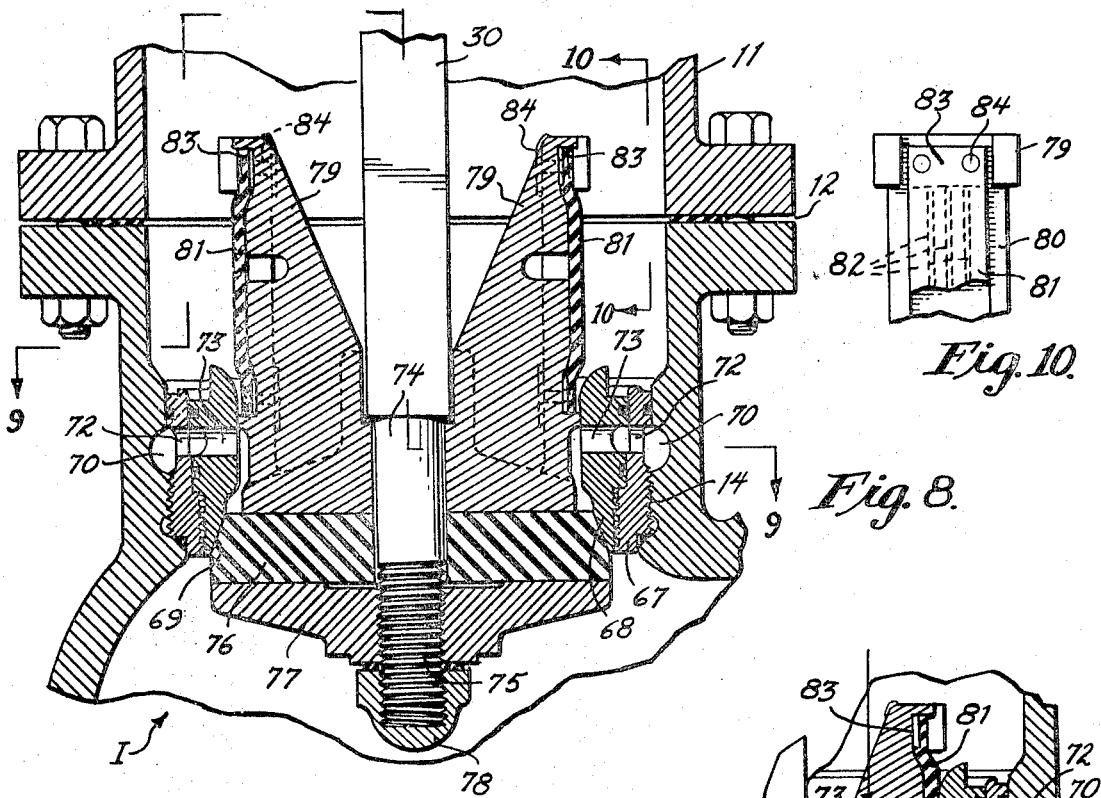
Fig. 8.
Fig. 10.
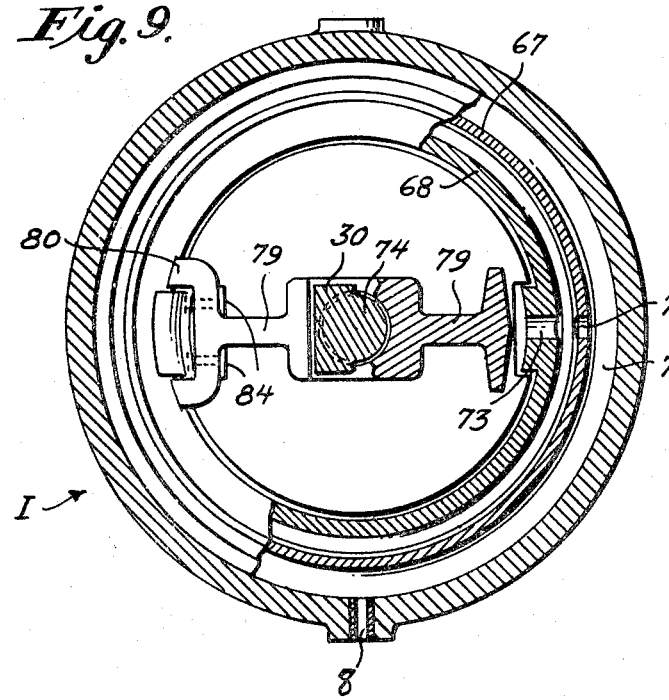
Fig. 9.
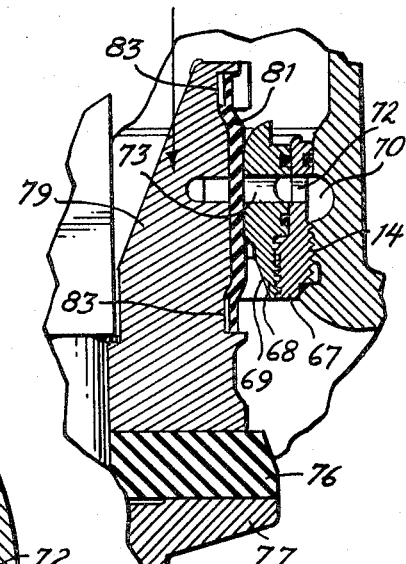
Fig. 11.
INVENTOR.
JOHN T. DUNTON
BY Daniel Rubin
ATTORNEY.

FIRE HYDRANT

This is a continuation of application Ser. No. 678,136, filed Sept. 20, 1967, in turn a division of application Ser. No. 421,580, filed Jan. 18, 1965 and both now abandoned.

The present invention relates to a fire hydrant and is concerned primarily with certain improvements which result in improved utility of such hydrants.

In accordance with present day standards and conventions a fire hydrant includes a casing comprising two cylindrical parts and a shoe with two cylindrical parts being joined by a bolted flange connection. When the hydrant is installed at its place of usage, this connection is close to the ground surface. It is now recognized as desirable if not absolutely necessary, that the connection between the casing parts be frangible. Thus, if the hydrant is struck by a vehicle, the top part of the casing will come free at the frangible connection without damage to functional parts of the hydrant.

An important object of the present invention is to provide a new and improved frangible connection between the casing parts. This improved connection consists essentially of a wide flange at the lower end of the upper casing part having a depending skirt and formed with bolt holes, a short flange on the upper end of the lower casing part opposite the said skirt, the lugs aligning with said holes in the upper casing flange. Each of these lugs carries an inwardly extending projection which engages the short flange, with the connection between the projection and the lug weakened. Thus, when the upper casing part is struck, the connection is broken at this weakened lug construction. Moreover, this arrangement presents the advantage of permitting assembly between the casing parts through any angular adjustment of the casing parts throughout the full 360°.

The casing encloses a valve stem which extends from the operating mechanism at the top to the main valve at the bottom. This valve stem also should be of two parts which are joined by a frangible connection.

Another important object of the present invention is to provide a new and improved frangible connection between the two parts of the valve stem. The improvement consists essentially of providing a sleeve which establishes the driving relation between the stem parts and which is pinned to the respective stem parts, being weakened by an annular groove that is offset from the meeting ends of the stem parts.

In accordance with conventional practice, an intake shoe is connected to the lower end of the lower casing part. The intake is provided with a valve seat and houses a main valve which is normally urged against the seat by pressure of water in the main. The valve is opened by being moved downwardly against the water pressure.

It is now recognized as standard practice to provide a drain valve about the valve seat so that after the valve is closed, any water which remains in the casing will be drained to the exterior thereof. However, when the intake valve is opened, it is desirable that the drain valve be closed so that all the water coming from the intake will pass upwardly to the discharge nozzle at the top.

Another important object of the present invention is to provide a new and improved closure for the drain valve. This improvement consists essentially of a pair of diametrically opposed rubber strips that are mounted on the structure which carries the intake valve and which rubber strips are formed with backing ribs which afford increased flexibility and which permit water to get back of the strips and thus, incorporate self-sealing properties thereinto whereby, water pressure urges the rubber strips against the drain ports.

The upper end of the valve stem is threaded and is received in a threaded stem actuator which when rotated moves the stem longitudinally either upwardly or downwardly. In order for this operation to take place a pressure plate which is integral with the bonnet closes the upper end of the casing. This pressure plate is formed with a shoulder that is engaged by a flange on the actuator and another object of the invention is to provide a self-lubricating thrust bearing such as a Teflon ring between the retaining nut and the flange.

Another object of the invention is to provide a new and improved bonnet which is secured to the upper casing part. This bonnet has an externally threaded skirt that is screwed into the upper casing part and the pressure plate aforesaid is integral with said skirt.

The pressure plate is formed with a sleeve which depends from the shoulder aforesaid and which receives the valve stem in spaced relation. The lower end of this sleeve is formed with an inwardly extending flange which snuggly receives the valve stem.

A bonnet or dome is formed with a central opening over the stem actuator and retaining nut. An object of the invention is to provide a closure for this opening in the form of a dust cap that is held in position by a screw bolt passing through the cap and screwed into the stem actuator. This bolt may be removed to permit the introduction of lubricant into the actuating mechanism at the top.

In accordance with conventional practice the upper end of the casing is provided with a pair of discharge nozzles in right angular relation. Each of these nozzles consists essentially of a short sleeve having a central abutment flange. On the inner side of this flange, the sleeve is threaded and screwed into an internally threaded nipple on the casing. On the outer side of the flange, the nozzle is provided with threads which receive either a cap during a period of nonusage or a hose connection when the hydrant is being used. An important object of the present invention is to provide a new and improved means for locking the discharge nozzle in the nipple aforesaid. To accomplish this, the nipple and nozzle are drilled after assembly to form aligned openings which receive a lock pin. When it is desired to remove the nozzle all that is required is to drive the pin inwardly and unscrew the nozzle from the nipple.

The invention therefore comprises a fire hydrant including a casing and valve stem having new and improved frangible connections, an improved drain valve, a stop at the top for limiting movement of the intake valve, an integral dome and pressure plate, a Teflon bearing between the stem actuator and retaining nut, and an improved lock arrangement for discharge nozzles.

For a full and more complete understanding of the invention reference may be had to the following description and accompanying drawings, wherein:

FIG. 2 is a sectional view on an enlarged scale of the upper end of the hydrant.

FIG. 3 is a detail sectional view of the lock for the nozzle being taken about on the plane represented by the line 3–3 of FIG. 2.

FIG. 4 is another detail partly in section and partly in elevation showing the stop nut on the valve stem in one limit.

FIG. 8 is a sectional view through the intake end of the hydrant.

FIG. 9 is a horizontal section through the intake being taken about on the plane represented by the line 9–9 of FIG. 8.

FIG. 10 is a detail illustrating one of the rubber strips which closes the drain port in elevation being taken on line 10–10 of FIG. 8.

FIG. 11 is a sectional view on an enlarged scale of the drain valve which closes the drain portion (Shown in one limit position), and FIG. 12 is a section view similar to FIG. 3 of an alternative form of locking pin for the nozzle.

THE GENERAL ASSEMBLY

Figure 1:
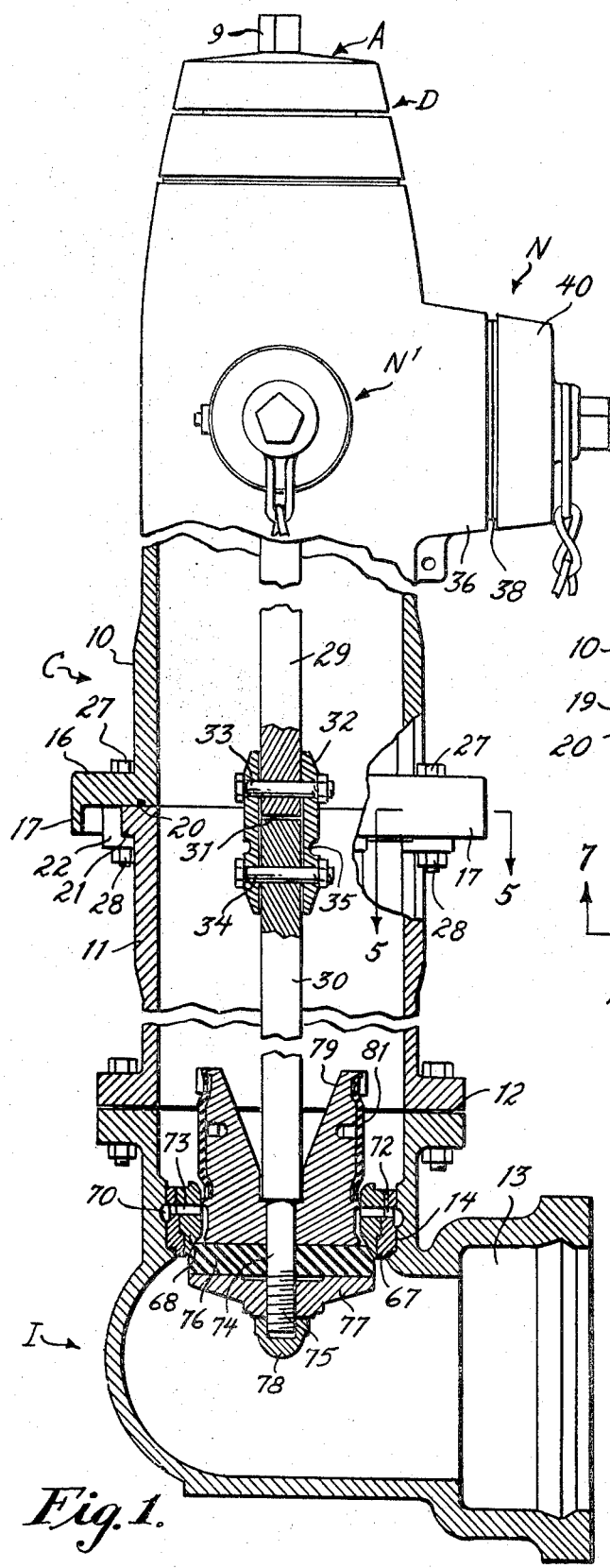
FIG. 1 is a side view partly in section and partly in elevation and with parts of the casing broken away, of a fire hydrant embodying the improvements of this invention.

A fire hydrant embodying the improvements of this invention comprises a casing which is referred to in its entirety by the reference character C. This casing C comprises an upper casing part 10 and a lower casing part 11. The parts are secured together by a frangible connection to be later described in detail. Secured to the lower end of the lower casing part 11 by a bolted flange connection 12 is an intake shoe I. The shoe I includes an intake opening at 13 which is connected to a water main and has a cylindrical bore 14 which receives a valve seat which will be later described.

The upper casing part 10 carries a plurality of discharge nozzles, each of which is referred to in its entirety by the reference character N and N' which are in right angular relation. Secured to the upper end of the upper casing part 10 by a threaded connection 15 is a dome D which in turn carries a dust cap A.

THE FRANGIBLE CONNECTIONS

Figure 5:
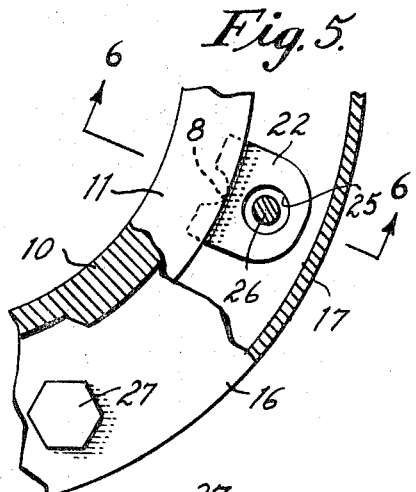
FIG. 5 is a detailed section through the frangible connection of the valve casing being taken about on the plane represented by the line 5–5 of FIG. 1.
Figure 6:
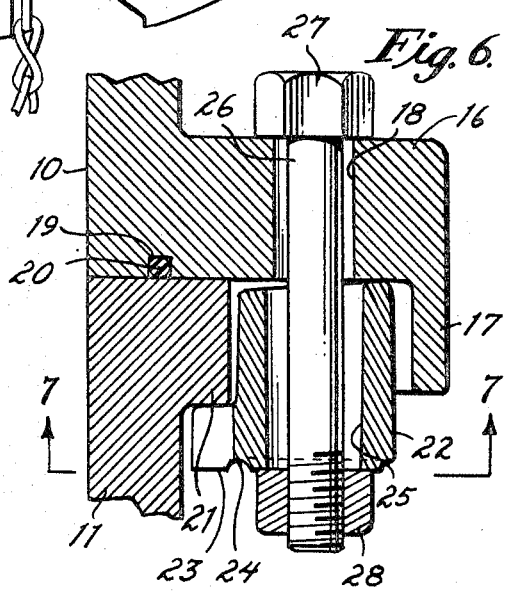
FIG. 6 is another detail section taken on an enlarged scale of this frangible connection being taken about on the plane represented by the line 6–6 of FIG. 5.
Figure 7:
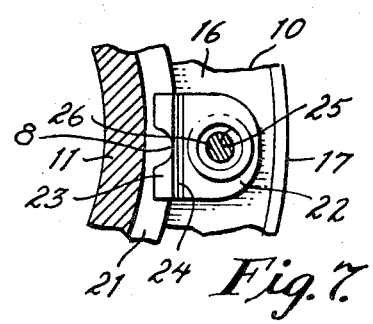
FIG. 7 is still another detail of this connection being taken about on the plane represented by the line 7–7 of FIG. 6.

Referring now more particularly to FIGS. 5, 6, and 7, integrally formed with the upper casing part 10 and at the lower end thereof is a comparatively wide outwardly extending flange 16 which in turn carries a depending skirt 17. The flange 16 is formed with a series of bolt holes 18. The lower end face of the casing part 10 has an annular groove 19 which receives an O-ring packing member 20 that engages the upper end face of the lower casing part 11.

The upper end of the lower casing part 11 is formed with a comparatively narrow outwardly extending flange 21 that is spaced from the skirt 17. A plurality of lugs 22 are received in this space, the number of lugs corresponding to the number of bolt holes 18. The top face of each lug has an inward draft or incline so that only the radially outer edge of each lug engages the underface of the flange 16. This eliminates the need for accurate machining and insures that the bolts to be later described are not subjected to a bending moment. Each lug 22 has integrally formed thereon an inwardly extending projection 23 with a notch or groove at 24 weakening the connection between the projection 23 and the main body of the lug 22. This projection 23 engages the under face of the flange 21 and is formed with an arcuate recess 8.

Each lug 22 aligns with a bolt hole 18 and in turn is provided with a bolt hole 25. Bolts 26 pass through aligned bolt holes. Each bolt 26 has a head 27 at one end and a nut 28 at the other. When the nuts 28 are tightened, the two casing parts are clamped together in assembled relation and the O-ring 20 provides an effective water seal. It is evident that the casing parts 10 and 11 may be assembled regardless of their angular relation. Thus, there are no bolt holes in the lower casing upper flange because the lugs 22 are movable. When a vehicle or other object strikes the upper part 10 with sufficient force, the connection will break at the groove 24 which weaken the connection between each projection 23 and lug 22. When the casing is to be reassembled, all that is necessary is to use new lugs 22.

A valve stem comprises an upper stem part 29 and a lower stem part 30, both of noncircular cross section such as the square shape illustrated. These stem parts have confronting end faces at 31. A connecting sleeve 32 is connected to the upper stem part 29 by a bolt 33 and the lower stem part 30 by a bolt 34. The sleeve 32 has a bore corresponding in cross section to that of the stem. This sleeve 32 is weakened by an annular groove 35 which will be noted is offset from the confronting end faces 31. This offset affords increased operational strength yet provides for the breaking of the stem parts when the set is broken. The noncircular cross section of the stem parts and sleeve establishes the driving relation between the stem parts.

The purposes of the improved frangible connection in the stem are threefold: First, to connect the two parts of the valve stem to provide upward and downward movement of the main valve under normal operation of the hydrant; second, to transmit rotational torque from the upper stem part to the lower stem part when it is desired to remove the main valve and seat ring from the hydrant, and thirdly, to provide for the breaking at a predetermined load. In order to prevent this torsional thrust from passing through the weakened annular groove, the groove is offset from the meeting ends of the stem thereby permitting the transfer of the torque to be through the solid metal section.

THE DISCHARGE NOZZLES

Except for the difference in diametrical dimension, the nozzles N and N' are substantially duplicates and only one of them is here described in detail as that is believed to be sufficient for the purposes of this specification.

Referring now more particularly to FIGS. 2 and 3, the upper casing part 10 is shown as formed with an outwardly extending nipple 36 which is internally threaded. A sleeve 37 has a central abutment flange 38 and on the inner side of the latter is externally threaded and is screwed into the nipple 36 with a gasket interposed between the two. On the outside of the flange 38, the sleeve 37 is provided with coarse threads 39 onto which is screwed a cap 40 as shown in the drawing or a hose connection when the cap is removed.

When the sleeve 37 is located in sealing engagement with the nipple of the gasket, a passage 41 is drilled providing an aperture 42 in the nipple 36 with the aperture being counterbored at 43 and the counterbore receiving an externally threaded plug 44. A lock pin 45 is driven into the apertures 41 and 42 locking the sleeve 37 in the nipple 36. The plug 44 is then screwed into the internally threaded aperture 43 providing sealed closure of the aperture 42 and counterbore 43. However, when occasion arises, the plug 44 can be removed and lock pin 45 may be removed from its locking position by simply driving it inwardly whereupon the sleeve 37 may be unscrewed.

An alternative form of locking device for securing the sleeve 37 in the nipple 36 as is shown in FIG. 12. These elements are formed with aligned apertures 2 and 3 and a lock pin 4 is driven thereinto with a tight fit. The pin 4 is formed with a groove 5 which receives an O-ring 6. The O-ring 6 serves to provide a seal. When removal of the sleeve is desired all that is necessary is to drive the pin 4 inwardly.

THE ACTUATING MECHANISM

The dome or bonnet D comprises a skirt 90 that is externally threaded with the threads being received in internal threads formed in the upper casing part 10 to achieve the threaded connection 15.

Integrally formed with the skirt 90 is a pressure plate 46 formed with an annular shoulder 47. Depending from this shoulder 47 is a sleeve 48 providing a bore 49 and a counterbore 50 separated by the shoulder 47. A stem actuator 53 is screwed onto the upper end of the valve stem part 29 which is threaded such as indicated at 54. The stem actuator 53 is formed with an annular groove 51 which receives an O-ring 52. The O-ring 52 provides an effective seal between the stem actuator and pressure plate sleeve 48.

The stem actuator 53 is formed with an outwardly extending flange 55 which engages the shoulder 47. The dome or bonnet is formed with a threaded opening at 56 which receives a retaining nut 57. A Teflon thrust bearing 58 is interposed between the nut 57 and the flange 55. This Teflon thrust bearing is self-lubricating and serves to reduce friction created by upward thrust of the stem actuator.

The Teflon ring provides three advantages over any existing design, namely: (1) It provides low turning torque with a corrosion resistant material. (2) There is no requirement for lubrication. (3) No danger of seizing due to the failure of the material.

The lower end of the sleeve 48 is formed with an inwardly extending flange 59 which defines an opening snuggly receiving the valve stem 29. The flange 59 is formed with an annular groove 60 which receives an O-ring packing member 61. The latter provides an effective seal at the lower end of the sleeve 48. The valve stem 29 also carries an abutment nut 62 which is adapted to engage the flange 59 as shown in FIG. 4 to limit lower movement of the valve stem caused by rotation of the actuator 53.

The actuator 53 is closed at its upper end by a top wall 63 formed with a threaded opening 64. The dust cap A is removably secured in position on the top of the dome over the opening 56 by a screw bolt 65. This screw bolt 165 may be removed to permit the introduction of lubricant through the opening 64 to the space in the aperture over and about the threaded end of the valve stem 29. The top plate 63 of the actuator 53 is provided with noncircular surfaces at 66 which in turn fit the corresponding surfaces on the dust cap A. The latter is formed with wrench engaging surfaces 9. Thus, the dust cap may be rotated to rotate the actuator.

THE VALVES

Referring now more particularly to FIGS. 8—11 inclusive, the bore 14 of the shoe I is threaded. Screwed into this threaded bore is a seat carrying ring 67 which is also internally threaded. Screwed into the latter is a valve seat ring 68 formed with a conical valve seat 69.

The intake shoe I is formed with an inwardly opening annular groove 70 which communicates with the exterior of the intake I through the medium of a drainage port 8. The seat carriers 67 and 68 are formed with aligned ports 72 and 73 which communicate with the groove 70. Thus, when the inner end of the port 73 is opened, communication between the interior of the casing and exterior of the intake shoe is provided and any water retained in the casing will be drained off through ports 72 and 73, groove 70, and drainage port 8.

The lower valve stem part 30 is reduced at 74 and the lower end of this reduced portion is threaded at 75. Mounted on this reduced stem part 74 is a main valve 76 which is held in position by a retaining plate 77 and lock nut 78 with a gasket interposed between the latter to prevent corrosion of threads 75.

Carried by the valve stem above the valve 76 is a drain valve comprising two webs 79 (identical) with each web 79 having an end structure 80 which carries a rubber strip 81 having integral backing ribs 82. The rubber strips 81 are reinforced by cross plates 83 at the top and bottom and are riveted to the end structure 80 by the rivets shown at 84. The ribs 82 are disposed inwardly and permit water to get in back of the strips 81 when the drain valve is in closed position as shown in FIG. 11. Thus, the drain valve partakes of the characteristics of a self-sealing valve in which the water pressure urges the rubber strips into sealing position. Moreover, the strip 81 with the ribs 82 are rendered flexible and more readily movable into port closing position.

It will be understood that when the intake valve is closed with the valve member 76 seated on the seat 69 as shown in FIG. 8, the drain valve is in its upper position in which the drain ports are open. Thus, water may drain from the casing.

When the intake valve is moved downwardly into open position, the drain valve with the rubber strips 81 also move downwardly into position closing the drain ports.

While preferred specific embodiments of the invention are hereinbefore set forth, it is to be clearly understood that the invention is not to be limited to the exact constructions, mechanisms, and devices illustrated and described because various modifications of these details may be provided in putting the invention into practice within the purview of the appended claims.

I claim:

1. In a fire hydrant, a frangible valve stem comprising separate upper and lower stem parts having end portions in confronting relation and of a noncircular cross section adjacent to said end portions, a connecting sleeve receiving the end portions of said end parts and of a corresponding noncircular cross section connected thereto establishing a rotative driving relation between said stem parts, said connecting sleeve having a substantially annular weakened portion for increased fracture susceptibility at a zone located sufficiently displaced axially from said confronting end portions to be removed beyond the established driving relation between said stem parts and sleeve whereby said driving relation between the stem parts is independent of said weakened zone.

2. The fire hydrant valve stem of claim 1 in which the connecting sleeve is pinned to the respective stem parts with the sleeve being weakened by an annular groove axially displaced from said confronting faces.

3. In a fire hydrant, a frangible valve stem comprising separate upper and lower stem parts having end portions in confronting relation, a connecting sleeve receiving said end portions and connected interlocked for rotative driving relation therewith, said connecting sleeve having a substantially annular weakened portion for increased fracture susceptibility at a zone located sufficiently displaced axially from said confronting portions to be removed beyond the established interlock between said connecting ends and sleeve whereby said driving relation between the stem parts is independent of said weakened zone.

4. The fire hydrant valve stem of claim 3 in which the connecting sleeve is pinned to the respective stem parts with the sleeve being weakened by an annular groove axially displaced from said confronting faces.

5. In a fire hydrant, a frangible stem comprising separate upper and lower stem parts to be connected in rotative driving relation and having confronting end portions, a connecting sleeve receiving the end portions of said stem parts and pinned thereto, and means for establishing a rotative driving relation between the stem parts intermediate and independent of said pinned connection, said connecting sleeve having a weakened portion for increased fracture susceptibility located at a zone between a pin and said established driving relation with the connecting sleeve thereat.

PO-1050
(5/69)

UNITED STATES PATENT OFFICE
CERTIFICATE OF CORRECTION

Patent No. 3,572,786  Dated  March 30, 1971

Inventor(s)  John T. Dunton

It is certified that error appears in the above-identified patent and that said Letters Patent are hereby corrected as shown below:

On the front page, left column, after line 9, add line:
--[73] Assignee: Dresser Industries, Inc.--

Signed and sealed this 2nd day of May 1972.

(SEAL)
Attest:

EDWARD M. FLETCHER, JR.
Attesting Officer

ROBERT GOTTSCHALK
Commissioner of Patents